US005623730A

United States Patent [19]
Baudou et al.

[11] Patent Number: 5,623,730
[45] Date of Patent: Apr. 29, 1997

[54] QUICK-FIT MODULAR HELMET

[75] Inventors: Joël Baudou, Medard En Jalles; Pascal Capdepuy, Merignac, both of France

[73] Assignee: Sextant Avionique, Velizy Villacoublay, France

[21] Appl. No.: 533,549

[22] Filed: Sep. 25, 1995

[30] Foreign Application Priority Data

Sep. 30, 1994 [FR] France .................................. 94 11735

[51] Int. Cl.⁶ ........................................................ A42B 3/04
[52] U.S. Cl. ........................................................ 2/6.2; 2/422
[58] Field of Search ................................ 2/410, 6.1, 6.2, 2/6.3, 422, 424, 10, 6.4, 6.5, 6.6; 359/407, 409, 815

[56] References Cited

U.S. PATENT DOCUMENTS

| | | |
|---|---|---|
| 3,548,411 | 12/1970 | Barstow et al. . |
| 4,907,296 | 3/1990 | Blecha ............................ 2/6.2 |
| 4,987,608 | 1/1991 | Cobb .............................. 2/6.2 |
| 5,184,231 | 2/1993 | Ellis .............................. 2/6.2 |
| 5,226,181 | 7/1993 | Polednak et al. . |
| 5,265,276 | 11/1993 | Kimberly, Jr. .................... 2/6.2 |
| 5,367,402 | 11/1994 | Holmes et al. ................... 359/400 |

FOREIGN PATENT DOCUMENTS

| | | |
|---|---|---|
| 0290293 | 11/1988 | European Pat. Off. . |
| 0471264 | 2/1992 | European Pat. Off. . |
| 2677604 | 12/1992 | France . |
| 2254160 | 9/1992 | United Kingdom . |
| 94/14349 | 7/1994 | WIPO . |

*Primary Examiner*—Michael A. Neas
*Attorney, Agent, or Firm*—Oblon, Spivak, McClelland, Maier & Neustadt, P.C.

[57] ABSTRACT

The disclosure is a helmet, for example a pilot's helmet, including a shell and an attachable structure carrying optronic equipment. To facilitate manual fitting and removal of the structure on the shell by the wearer, the structure is equipped with mobile linkage parts that can take two stable positions, with a mechanism for locking the linkage parts in these positions, an open position used during the initial positioning of the structure on the shell, and a closed position in which the linkage parts lock the structure on the shell. Fitting and removal of the structure is further facilitated by the fact that the linkage parts can be opened or closed simply by pressing manually on two parts mounted symmetrically, one on each side of the shell, and that each position of the linkage parts is maintained by the mechanism for locking.

16 Claims, 9 Drawing Sheets

QUICK-FIT MODULAR HELMET

BACKGROUND OF THE INVENTION

The invention relates to helmets equipped with optical means of display, for example helmets used by military aircraft pilots.

Such a helmet includes a shell providing protection against perforation. This shell is lined internally with material to protect the head of the pilot against shocks; it also includes a display device. The purpose of such display devices is to present information to the pilot in symbolic form. This information is superimposed visually on the exterior landscape. When the information represents objects that are masked or not yet in sight in the landscape they must be displayed in their true direction relative to a ground-based frame of reference. For this reason and for reasons of sharpness of the image, the various parts of the display device must have fixed positions relative to each other and to the eye of the pilot.

In known helmets the display device includes means of projection of the symbolic image. The projection is carried out on a combiner that returns a reflected image towards the eye of the pilot. The projection/reflection device provides a collimated image for reasons of visual comfort. The combiner is a partially mirrored surface that transmits light rays from the exterior landscape and reflects (at least partially) light from the projection means. Generally the combiner is constituted by part of the protective visor fitted to the helmet.

The positioning of the optronic display equipment relative to the pilot's eye is carried out during a personalization phase which includes an adaptation of the liner to ensure that the future wearer of the helmet will see the symbolic image in a comfortable position.

It is known that the shell of the helmet to which the optronic display equipment is attached can be deformed by forces to which it is subjected. It is known that, in some cases, the optronic display equipment is mounted on removable structures that can be attached to fastening systems mounted on the helmet. One such arrangement is described in the U.S. Pat. No. 4,156,292, dated 29 May 1979.

SUMMARY OF THE INVENTION

The present invention relates to such a helmet able to receive a movable structure carrying optronic display equipment. Moreover, the invention enables the wearer of the helmet to fit and remove by himself different structures fitted with different equipment. A given protective helmet adapted to the shape of the pilots head can then be equipped with different types of equipment, chosen according to the requirements of the mission, such as:

a display device for use in daylight, a display device for use at night, night vision binoculars, protective screening visors.

With the present invention it is possible for a crew member (pilot, navigator, observer, gunner) to change the helmet equipment according to the evolution of the mission and the exterior conditions. The change is rapid and requires no tools.

For these purposes, the invention is a helmet composed of two main parts, a shell with two side panels connected by the front and rear panels of the shell, and a rigid structure shaped to receive optronic devices, in which the structure can be mounted on and removed from the shell by means of a set of attachments, each attachment including linkage parts in the form of a stud and a cylinder, one of the linkage parts being attached to the shell and the other to the structure, each cylinder having an axial direction, wherein at least one linkage part in each of two of the attachments mounted on the structure is mobile relative to this structure and can be moved into open and closed positions, such that in the open position the two mobile linkage parts enable the structure to be placed on the shell, and in the closed position these mobile linkage parts assure the linkage with the shell via the corresponding linkage parts on the shell, and wherein the structure is equipped with means of holding these mobile linking parts in their open and closed positions, the change from open to closed position being obtained by pressing manually on a part that includes the mobile linkage part mounted on the structure, the pressure being applied to each the parts on each of the two attachments substantially along the axial direction of each of said cylinders.

Thanks to the invention, the wearer of the helmet sitting in the cockpit can pick up the rigid structure fitted with the optronic equipment, place it in position on his helmet, then with each hand close the attachment mechanisms on each side of the structure, in which position they engage pans fixed to the shell to lock the structure onto the shell. Parts within these attachment mechanisms then hold them closed. In a similar way, to separate the rigid structure from the helmet, the wearer manually releases the attachment mechanisms in order to unlock the linkage parts. In one embodiment, the opening of the linkage parts is assured by a spring-loaded system. The locking of the linkage parts in closed position ensures that the rigid structure is solidly attached to the helmet. The locking of the linkage parts in open position enables the structure to be fitted or removed without having to worry about the position of the linkage parts attached to the structure.

In the preferred embodiment, each of the attachment mechanisms provides for a local displacement along a local direction D of the helmet shell relative to the structure. This local direction is the axis of the local cylinder.

The sliding of the studs in the cylinders provides for a degree of relative movement between the shell relative to the structure carrying the optronic equipment, the whole maintaining a constant relative position. The purpose of the locally mobile linkage parts is to completely decouple the functions of the shell of the helmet and the rigid structure that is linked to the shell and that carries the optronic equipment. In this way the shell assumes its prime function of assuring the protection of the pilot and can therefore be made lighter. Moreover, the mechanical structure supporting the optronic equipment no longer has to be designed to resist the deforming stresses associated with deformations of the shell, and therefore can also be made lighter. The advantages for the pilot are better protection, improved comfort (due to the reduced weight) and greater ease of fitting and removal of the helmet.

The linkage parts are preferably placed to permit normal movements of the shell and the attached structure. Consequently, in a preferred embodiment, the invention includes a stud/cylinder linkage on each of the lateral panels of the shell, and a third stud/cylinder linkage, whose axis is located in the plane of symmetry of the shell, to provide lateral stability for the shell/structure assembly. Preferably this third connector is located on the upper front part of the shell.

The plane of symmetry of the shell is (when worn on the head) the vertical plane of symmetry of the wearer's body. This plane is mentioned only to provide a frame of reference for the positions of the means of attachment.

The shell and structure are advantageously equipped with parts designed to guide the structure into its final locked position on the shell, for example a female funnel-shaped part mounted on one of these parts that is engaged by a male cone-shaped part mounted on the other part, such that when the structure is moved from the front towards the rear of the shell the cone slides into contact with the end of the funnel or some other stopping part.

BRIEF DESCRIPTION OF THE DRAWINGS

An example of an embodiment of the helmet according to the invention is described below with reference to the appended drawings, in which.

MORE DETAILED DESCRIPTION OF THE DRAWINGS

Figure 1:
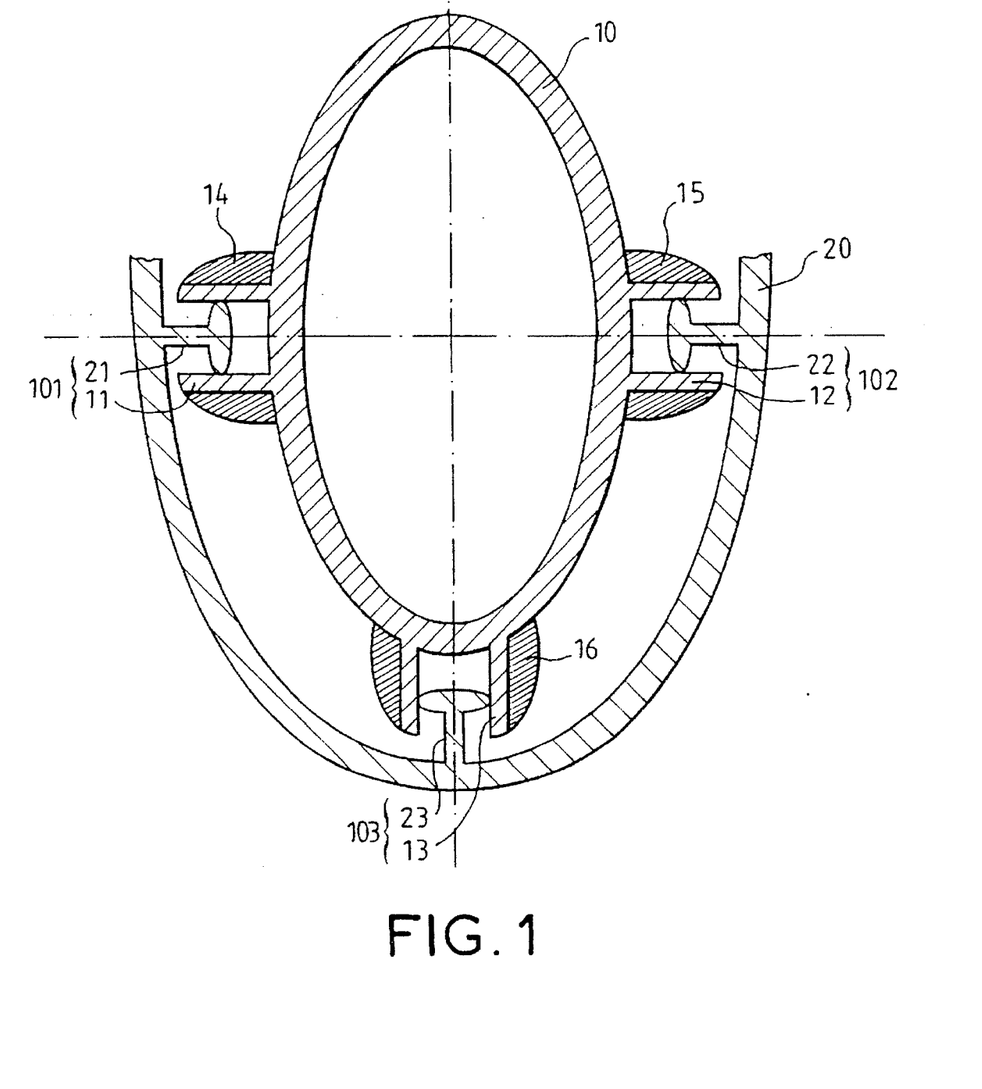
FIG. 1 shows a schematic section of a helmet according to the invention in a plane cutting three points of attachment between the helmet shell and the structure.

FIG. 1 shows a sectional view of three attachments 101, 102, 103 between the helmet shell 10 and a structure 20 bearing optronic equipment. The purpose of this figure being to show the isostatic attachment principle between the shell 10 and the structure 20, the attachments appear larger than in reality. In the preferred embodiment, the attachments are constituted by three cylinders 11, 12, 13, shown attached to the shell 10 in FIG. 1, and three studs 21, 22, 23, shown attached to the structure 20 in FIG. 1. The section shown in FIG. 1 is in the plane cutting these three attachments. With this method of attachment the shell 10 can deform without exerting significant stress on the Structure 20. Deformation of the shell 10, for example during the fitting of the helmet on the pilot's head, causes local movements of the cylinders 11, 12, 13 along the studs 21, 22, 23, these local movements being along the direction of the axis of each cylinder. In the preferred embodiment, the cylinders 11 and 12 are borings made in bosses 14, 15 on the sides of the shell 10. The third cylinder 13 is bored in the central boss 16 located in the plane of symmetry of the shell 10. This boss 16 is positioned symmetrically relative to the plane of symmetry of the shell 10.

Figure 2:
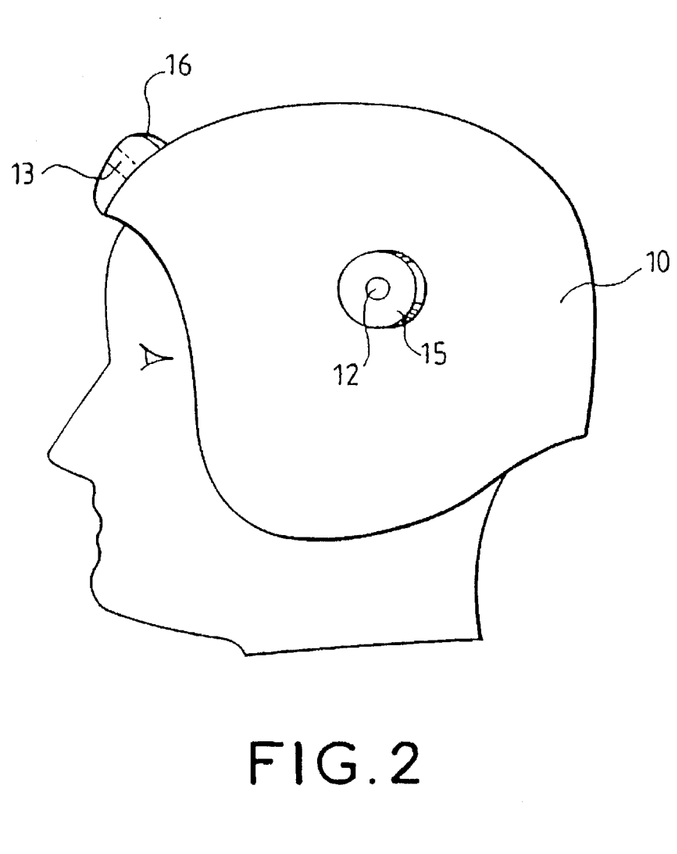
FIG. 2 shows a side view of a helmet showing an example of an embodiment of the linkage and guidance parts on the shell.

FIG. 2 is a side view of the helmet shell 10, showing the bosses 15 and 16, the borings 12 and 13, and a stop whose purpose is described later.

Figure 3:
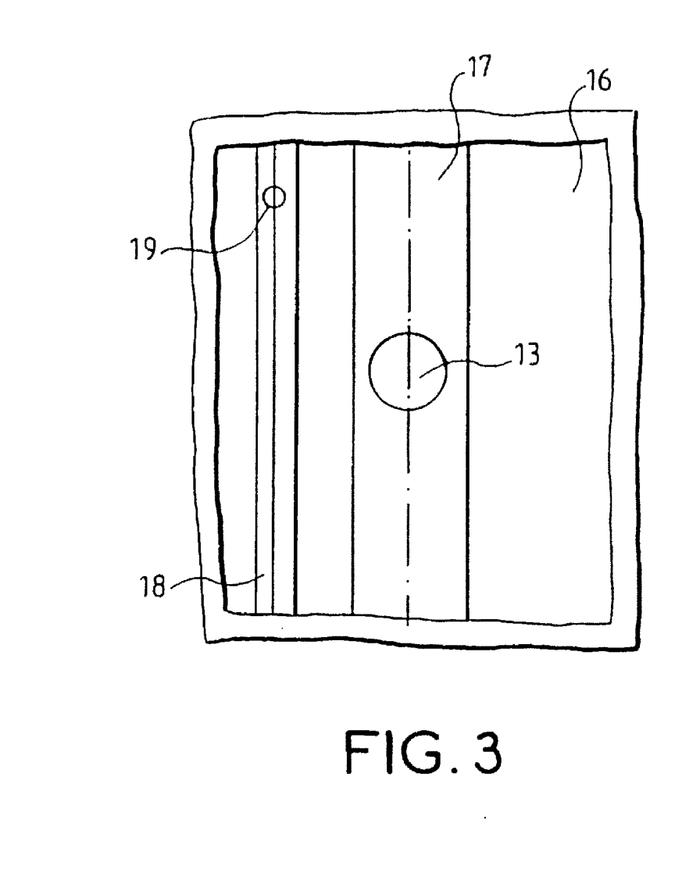
FIG. 3 shows a front view of an embodiment of a boss on the shell.

For the purposes of an embodiment described later in which the rigid structure can be rotated on the helmet about two attachment assemblies, one on each side of the shell, the boss 16 preferably includes, as shown in the front view in FIG. 3, a longitudinal groove 17 lying in the plane of symmetry of the shell. This groove guides the vertical rotation of the stud 23. Similarly, in this embodiment the boss includes a V-shaped groove 18 cut in the boss and parallel to the groove 17. This groove guides the rotation of a catch that is used to hold the structure in an upper position by insertion of the catch in a hole 19.

Figure 4:
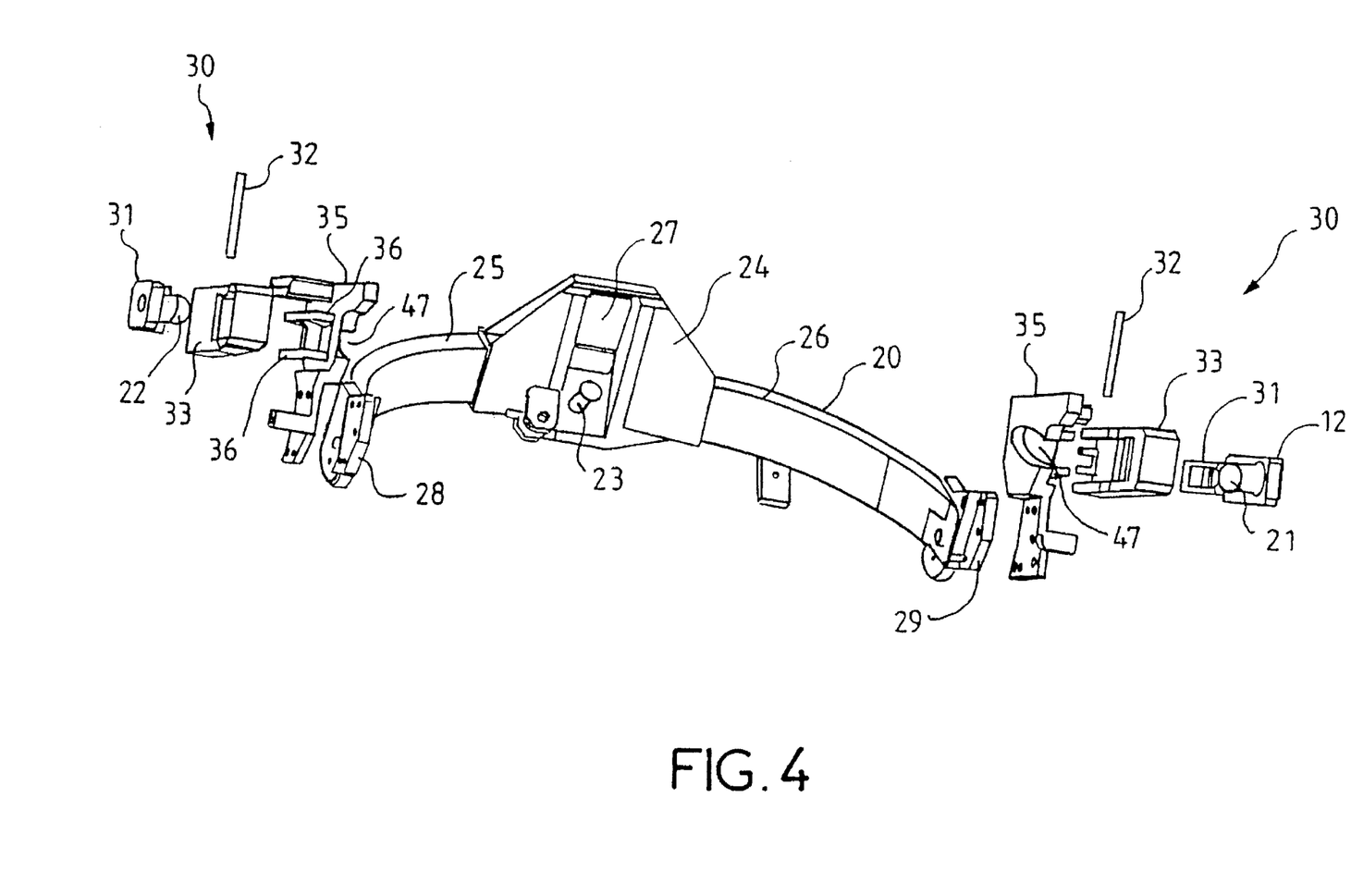
FIG. 4 shows an exploded perspective view of a first embodiment of a rigid structure including moving linkage parts used for fastening the structure on a helmet shell.

FIG. 4 is an exploded perspective view of an example of an embodiment of a structure 20 made to fit on the helmet shell of FIG. 2. The structure 20 includes a central part 24 that has two lateral arms 25, 26. The attachment studs 21, 22, 23 are mounted as follows: stud 23 is screwed into a concave rectangular cavity 27 whose shape is designed to receive the central boss 16 of the shell 10; the side studs 21, 22 form part of removable attachment mechanisms 30 comprising several parts.

Each mechanism 30 is mounted on one end 28, 29 of the lateral arms 25, 26. The structure 20 is substantially symmetric about the plane of symmetry of the wearer of the helmet. Each attachment mechanism 30 includes an arm 31 pivoting about an axis 32. Each articulated arm 31 carries a stud 21, 22. The mechanism also includes a slide 33 and a spring 34 (not shown in FIG. 4). The mechanisms 30 are mounted on plates 35 that are themselves fixed on the ends 28, 29 of the arms 25, 26. In addition to means of fastening the plates 35 on the ends 28, 29, by means of aligned holes as shown in FIG. 4, each plate 35 includes a sliding rail 36 on which the slide 33 can ride, and a boring 37 (see FIG. 5) that receives the pin 32 which serves as the pivot for the arm 31.

Figure 5:
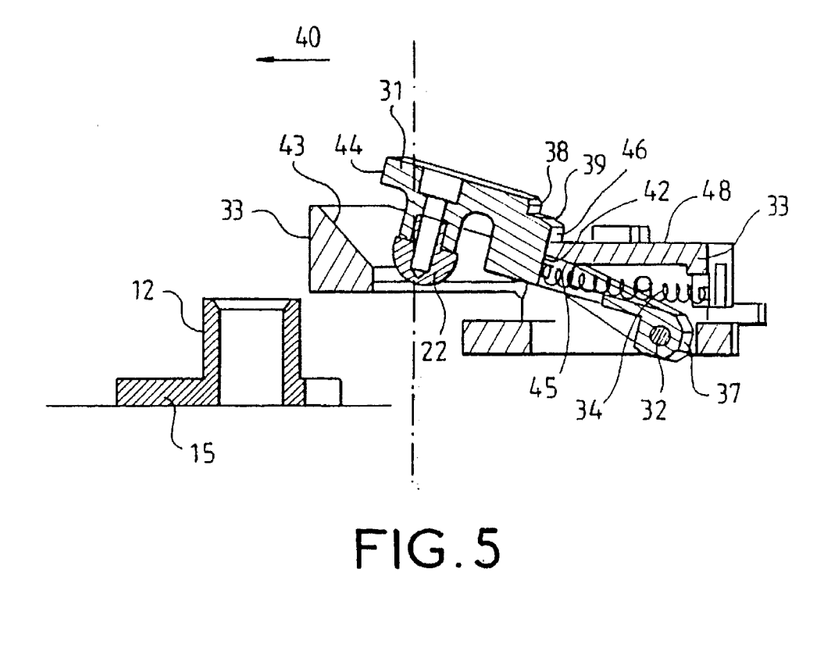
FIG. 5 shows a sectional view of a first embodiment of an attachment mechanism fixed to the structure and including an linkage part that can be rotated about an axis. The section is perpendicular to the axis of rotation of this linkage part and in its plane of symmetry, the part being shown in its open position and approaching a corresponding linkage part on the helmet shell.
Figure 6:
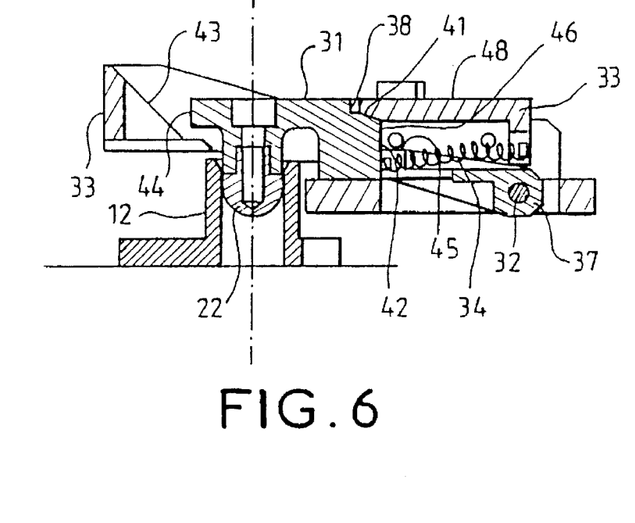
FIG. 6 shows the same section as in FIG. 5, with the linkage part in its closed position and engaged in the corresponding linkage part on the helmet shell.

Detailed sectional views of the attachment mechanism 30 are shown in FIGS. 5 and 6. The section is in a plane perpendicular to the pin 32, in fact the plane of symmetry of the arm 31, the slide 33 and the sliding rail 36. FIG. 5 shows an attachment mechanism in its open position with the structure 20 close to its attachment position on the helmet. FIG. 6 shows the same mechanism in closed position, the stud 22 engaged in the cylinder 12 of the shell 10.

The operation of the mechanism is as follows: after being guided by means of guidance described later, the stud 22 arrives opposite the cylinder 12. The user then pushes the articulated arm 31 manually so that it pivots about its axis 32 to insert the stud 22 in the cylinder 12. A spring 34 is connected in extension between the arm 31 and the slide 33, pulling the latter in the direction of the arrow 40. The spring 34 causes an upper part 48 of the slide 33 to engage a part 38 of the arm 31 when the latter is in its closed position. A small chamfer 39 on the articulated arm 31 and another 41 on the upper part 48 facilitate this engagement of the arm 31 by the slide 33. When the stud 22 is in engaged position, the chamfers 39 and 41 are in contact with each other. To re-open the mechanism, the user pushes the slide 33 in the opposite direction to the arrow 40 of FIG. 5. The combined action of the spring 34 and the inclined face 43 at the front end of the slide 33, which encounters the front part 44 of the arm 31, causes the arm to pivot outwards, thus withdrawing the stud 22 from the cylinder 12. The movement of the arm 31 is limited by the fact that a part 45 of the arm encounters the chamfer 41 of the upper part 48 of the slide 33. The mechanism is locked in this open position by the fact that the front edge (i.e. in the direction of the arrow 40) of the upper part 48 is not quite perpendicular to the sliding direction; under the action of the spring, this part engages a V-shaped recess 42 in the arm 31. In the embodiment shown in FIGS. 5 or 6, we note that this upper part 48 of the slide 33 assures the locking of the arm 31 in both its open and engaged positions. In this configuration, this open V 42 formed by the upper surface 45 of the arm (that comes into contact with the upper part 48) and a plane 46 that makes an angle of a little over 90° with this upper surface 45, is located lower and closer to the axis 32 than the chamfered surface 39 of this same arm. Owing to the fact that the plane 46 lies at a small angle to the tangent of an imaginary cylinder whose axis is the pivot pin 32 of the arm 31 and whose circumference passes close to the surface 46, a force exerted on the arm 31 is augmented by a lever effect exerted by this surface 46 which tends to push back the slide 33, which facilitates the closing of the arm 31.

To summarize, the wearer closes the attachment mechanism 30 simply by pressing on the arm 31, and releases it from the shell (the arm 31 moving into open position) by pushing back the slide 33.

To assist the wearer when fitting the structure to his helmet, the structure is guided towards its final position by closed-ended slots 47 (see FIG. 3) cut in the plates 35 on which the attachment mechanisms 30 are mounted. These slots are in contact with the top and rear of the bosses 14, 15 (FIG. 2) on the shell when the structure 20 is in position.

The fitting and removal of the structure on the shell is carried out as follows: the wearer picks up the structure 20 bearing a display device (not shown in the figures) with both hands and makes sure the arms 31 carrying the two attachment studs 21, 22 are in open position by pushing on the slides 33. The structure 20 is then raised towards the front of the head (in the same manner as when putting on spectacles). The pre-guidance of the structure 20 on the shell 10 is provided by the engagement of the bosses 14, 15 of the shell in the slots 47 in the plates 35 on the structure 20. The precise positioning of the studs 21, 22 is assured, first, by the engagement of the boss 16 on the front of the shell in the concave rectangular cavity in the structure 20 and, secondly, by the side bosses 14, 15 encountering the ends of the slots 47. In this position the front stud 23 naturally engages the cylinder 13 in the front boss 16. The wearer can then engage the side studs 21, 22 in the cylinders 11, 12 by pressing on the articulated arms 31. The structure 20 is then isostatically attached to the helmet shell.

Removal of the structure 20 is also achieved in a natural manner: the wearer takes hold of the structure on his helmet with both hands: the thumbs push forwards on the slides 33 releasing the attachment mechanisms 30 under the action of the springs 34 and allowing the structure 20 to be lifted away towards the front.

Figure 7:
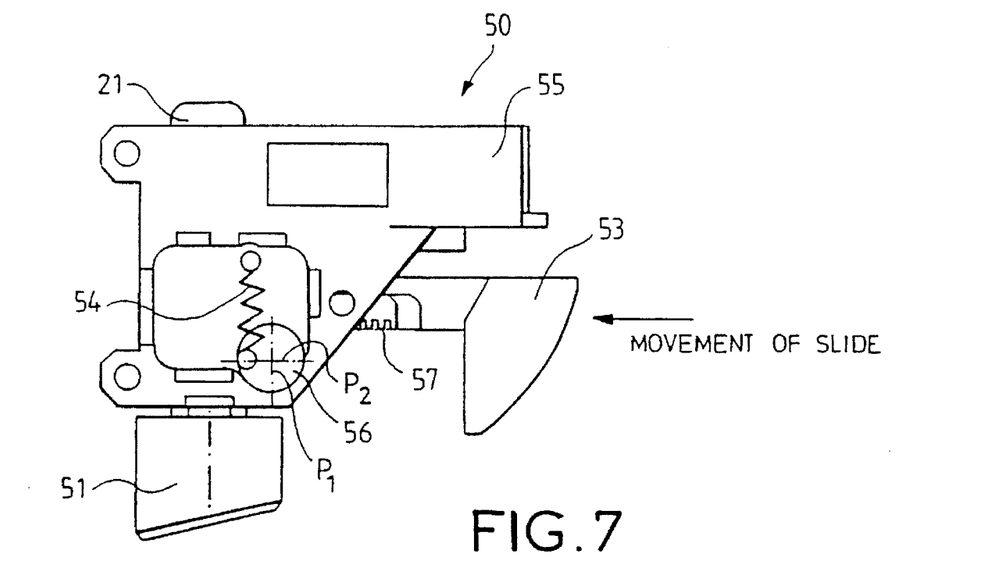
FIG. 7 shows a second embodiment of the attachment mechanism which in this case includes a push-button that can move in and out relative to the shell.

A second embodiment of an attachment mechanism 50 will now be described with reference to FIGS. 7 and 8. This mechanism includes a body 55 on which all the component parts are mounted and which is used to mount the mechanism on the ends 28, 29 of the rigid structure 20. The stud 21 is located at the end of a push-button 51. In FIG. 7, the stud 21 is in its engaged position on the helmet shell; in FIG. 8 it is disengaged. This push-button includes a rack 52 that drives a pinion 56. A spring 54 has one end attached to the body 55 and the other to the free face of the pinion. This first part of the mechanism operates as follows: when the push-button 51 is pressed fully in, such that the stud 21 engages the cylinder 11 in the shell, the position of the end of the spring 54 connected to the pinion 56 is such that the spring 54 exerts a couple on the pinion 56. This couple tends to turn the pinion 56 in the direction in which it exerts a force on the rack 52 tending to push the stud 21 into the cylinder 11. When the push-button is pulled out, withdrawing the stud 21 from the cylinder 11, the same end of the spring exerts a couple on the pinion 56 tending to turn the pinion 56 in the direction in which it exerts a force on the rack 52 tending to pull the stud 21 out of the cylinder 11. If we consider a plane P1 perpendicular to and passing through the center of the pinion 56, and parallel to the direction of movement of the push-button 51, the point of application of the force of the spring must be on one side of this plane when the push-button is pushed fully in, and on the other side when it is pulled fully out. If we consider a plane P2 perpendicular to and passing through the center of the pinion 56, and perpendicular to the direction D of movement of the push-button 51, the point of attachment of the spring on the pinion will be preferably in or near the plane P2 on one side or the other of the plane P1, depending on whether the stud 21 is engaged or disengaged. Attached at this point, the spring exerts the maximum couple on the pinion in the engaged and disengaged positions.

In this embodiment, in order to conserve the same ease of use as in the previous embodiment (mechanism 30), a slide is also provided in this case. This slide 53 moves in a direction perpendicular to the direction of movement D of the stud 21. It is fitted with a rack 57 that drives the pinion 56. In a variant of the embodiment, this could be a separate pinion turning on the same spindle as the pinion 56, or even on a different spindle, driving the pinion 56 via a system of cog wheels.

Figure 8:
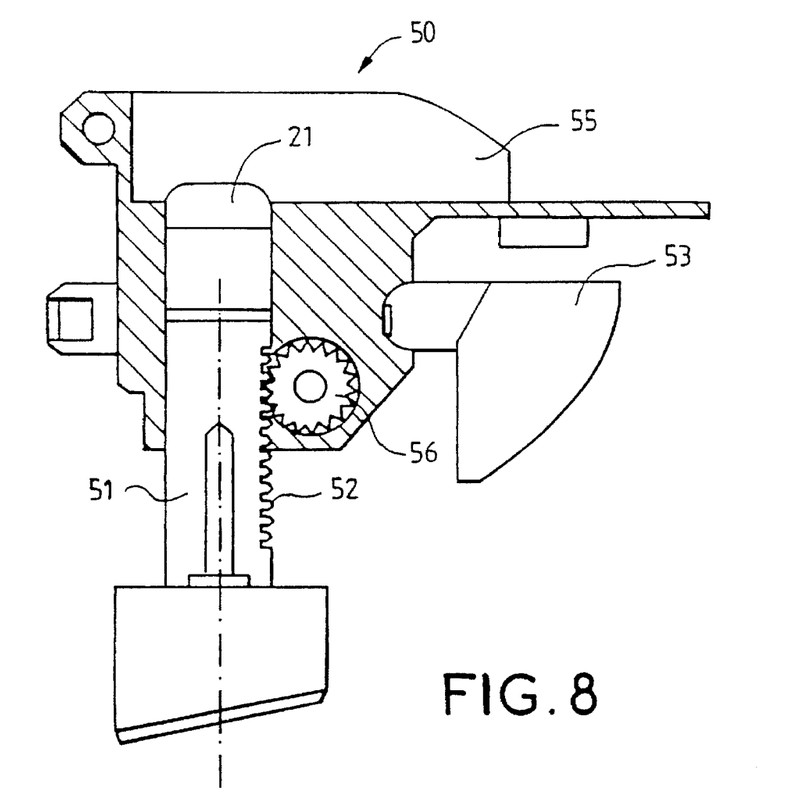
FIG. 8 is a sectional view of the mechanism shown in FIG. 7.

FIGS. 7 and 8 show the mechanism 50 in planes parallel to the directions of movement of the push-button 51 and the slide 53. In FIG. 7, the stud 21 attached to the push-button 51 is in engaged position and the slide 53 is in its outer position; in FIG. 8 the stud 21 is disengaged and the slide is in its inner position. The means of fixing the body 55 on the arms 28, 29 of the structure 20 are not shown in these figures.

The operation of this attachment mechanism is as follows: when the push-button 51 is pushed in the slide 53 moves to its outer (protruding) position. To withdraw the push-button 51, thereby disengaging the stud 21, the wearer pushes on this slide. During this movement the rack 57 turns the pinion 56, which acts on the rack 52 to move the push-button outwards.

Thus, from the user's point of view, the attachment mechanisms 30 and 50 are used in an identical manner: to engage the studs 21 he pushes respectively on the arm 31 or on the push-button 51; to release the studs, he pushes on the slide 33 or the slide 53.

A different means of engaging the front stud 23 in the cylinder 13 will now be described.

The means of frontal fastening described with reference to FIG. 4 consists of a stud 23 fixed to the front of a cavity 27 in the rigid structure 20. This stud then assures the initial contact between the structure 20 and the shell 10 during fitting; it enables the wearer to release the structure 20 momentarily to move this hands to the attachment mechanisms on each side. The mechanism that we shall now describe provides this same facility and also enables the rigid structure 20 to be worn in two different positions, an upper position and a lower position. When the structure 20 is mounted on the shell 10, the change from one of these positions to the other is achieved by rotation of the structure about an axis constituted by the side studs 21, 22 and cylinders 11, 12.

In the lower position, the stud 23 is engaged in the front cylinder 13 in the boss 16. In the upper position, the stud 23 is disengaged from the cylinder 13; in this position, the structure is immobilized by a catch engaging a hole in the front boss 16.

An example of the mechanism enabling a rotation of the structure about the side studs 21, 22, while fixing it in an upper or lower position will now be described with reference to FIGS. 9 to 12.

Figure 9:
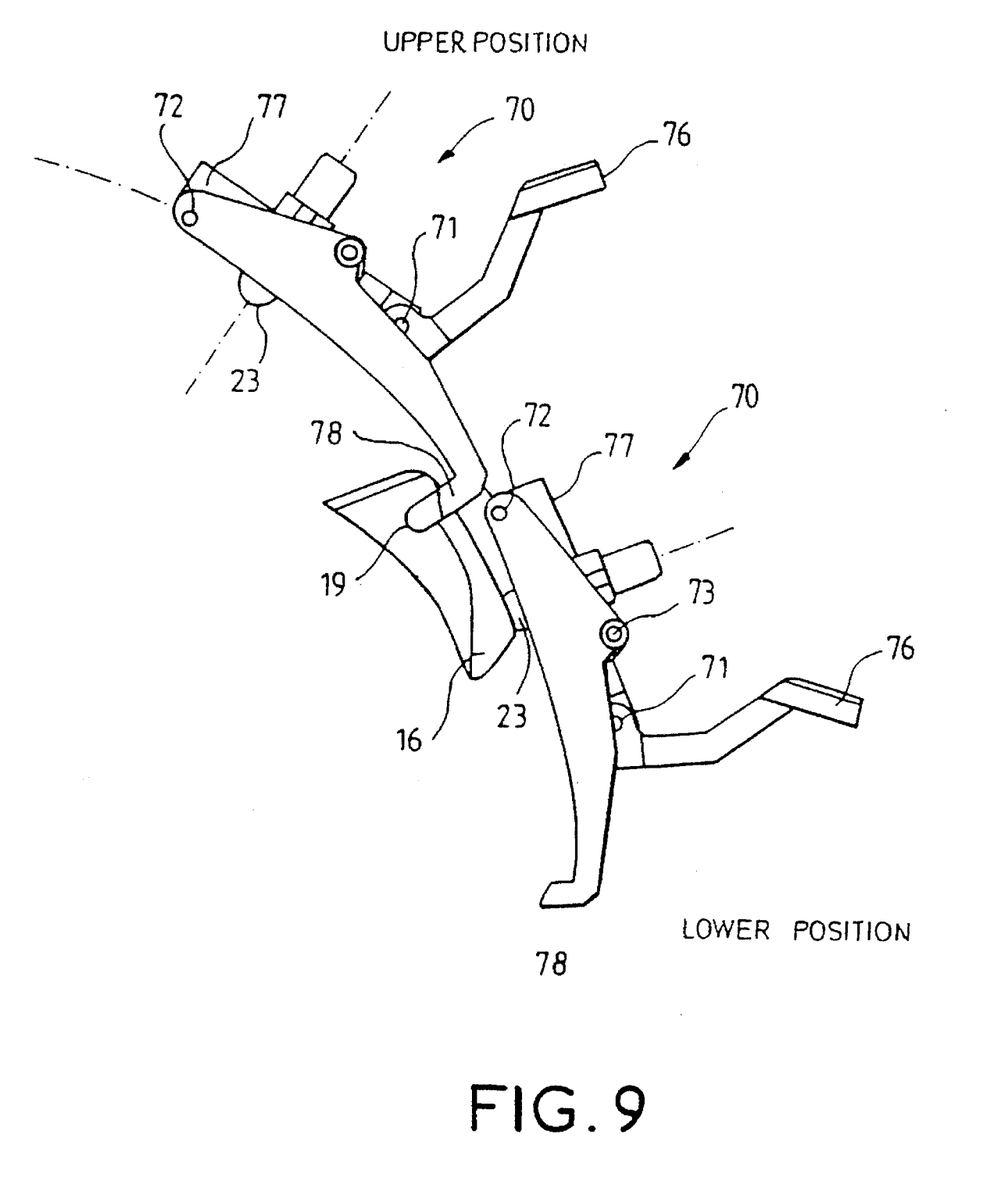
FIG. 9 is a schematic view of the upper and lower positions of a device mounted on the rigid structure and which permits the rotation of the structure relative to the shell between an upper position and a lower position.

FIG. 9 is a schematic view of a mechanism 70 fixed on the structure 20 and enabling a rotation of the structure about the side studs 21, 22. This figure shows part of the boss 16 of the shell and the mechanism 70 in two positions, an upper position and a lower position. This rotation is made possible by retracting the stud 23 and a catch 78 by means of a control lever.

The mechanism 70 used to retract the central stud 23 is composed of a control lever 76 pivoting about a spindle 71 fitted on a body 77 fixed to the rigid structure 20. A catch 78 pivoting about a spindle 72 fitted on the body 77 can be engaged in a hole 19 in the boss 16 to maintain the structure 20 in it upper position. The stud 23 and the catch 78 have two stable positions: if there is no pressure on the lever 76, both the stud 23 and the catch 78 protrude outwards under spring pressure. The structure can be immobilized either in the upper position, in which case the stud 23 engages the cylinder 13 in the boss 16, or in the lower position, in which case the catch 78 engages the hole 19 in the boss 16. If the lever 76 is pushed, the stud 23 and the catch 78 are both pulled away from the shell 10 and the structure 20 can be rotated about the side studs 11, 12.

Figure 10:
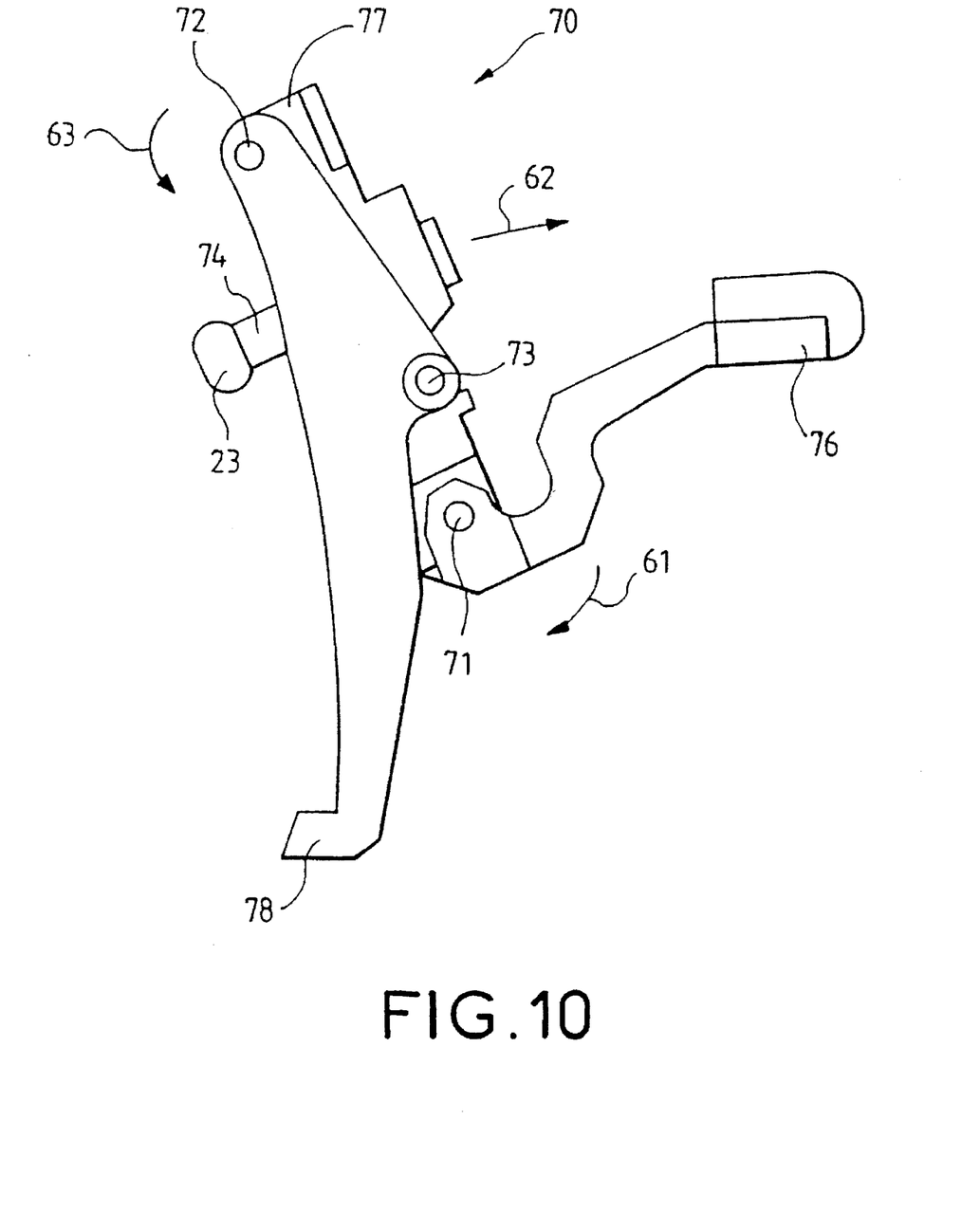
FIG. 10 is a view of this same device showing the direction of movement of the control lever and two immobilization parts.

FIG. 10 shows a side view of the mechanism 70 alone. The stud 23 and catch 78 are in their positions when there is no action on the lever 76. This figure also shows the arrows 61, 62, 63 indicating the directions of movement of the lever 76, the stud 23 and the catch 78. Movement of the lever 76 causes rotation of the catch about its axis 72 by movement of a finger 73. The movement of the stud 23 is due to the action of the lever 76 on a pin 74 sliding in the body 77, and also via the action of a finger 75 (shown in FIGS. 11 and 12). Springs connecting the catch 78 and the pin 74 to the body 77 ensure that the mechanism returns to the configuration shown in FIG. 10 when the pressure on the lever 76 is released. There are many ways of causing small translations or rotations of mobile parts under the action of a lever attached to a body. The lever can be fitted with teeth, so that the rotation of the lever causes movement of parts via pinions or toothed sectors. The embodiment described with reference to FIGS. 11 and 12 is only one example among many; it is a compromise taking into account the weigh and size of the parts.

Figure 11:
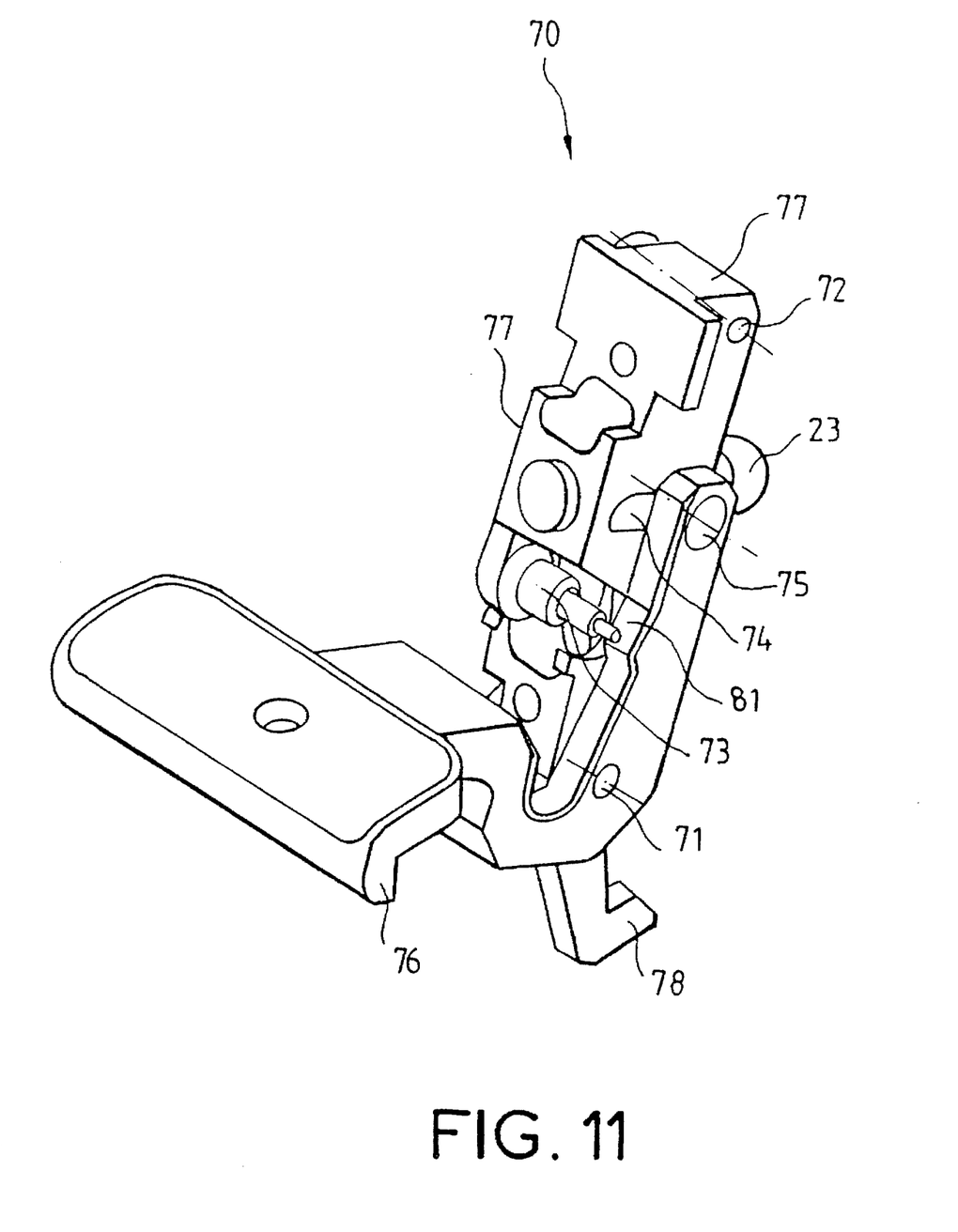
FIG. 11 is an open perspective view of this same device illustrating the mechanism of withdrawal of one of the immobilization parts.

FIG. 11 is intended to show the action of the lever 76 on the catch 78; FIG. 12 shows the action of the lever 76 on the pin 74 carrying the stud 23. FIG. 11 is a front view of the mechanism 70, with a view of the body 77 cut away along planes parallel to the spindle 71 of the lever 76; it shows the action of the lever 76 on the catch 78. The lever 76 includes a ramp 81 that moves when the lever is rotated about its spindle 71. This ramp pushes the end of the finger 73 attached to the catch 78. This causes the catch to rotate about its axis 72. To allow the finger 73 to move, the body 77 includes oblong slots whose ends serve as stops when the lever is in its rest position or when the catch 78 is withdrawn. The rotation of the lever 76 also causes movement towards the front of a finger 75 that traverses the pin 74.

Figure 12:
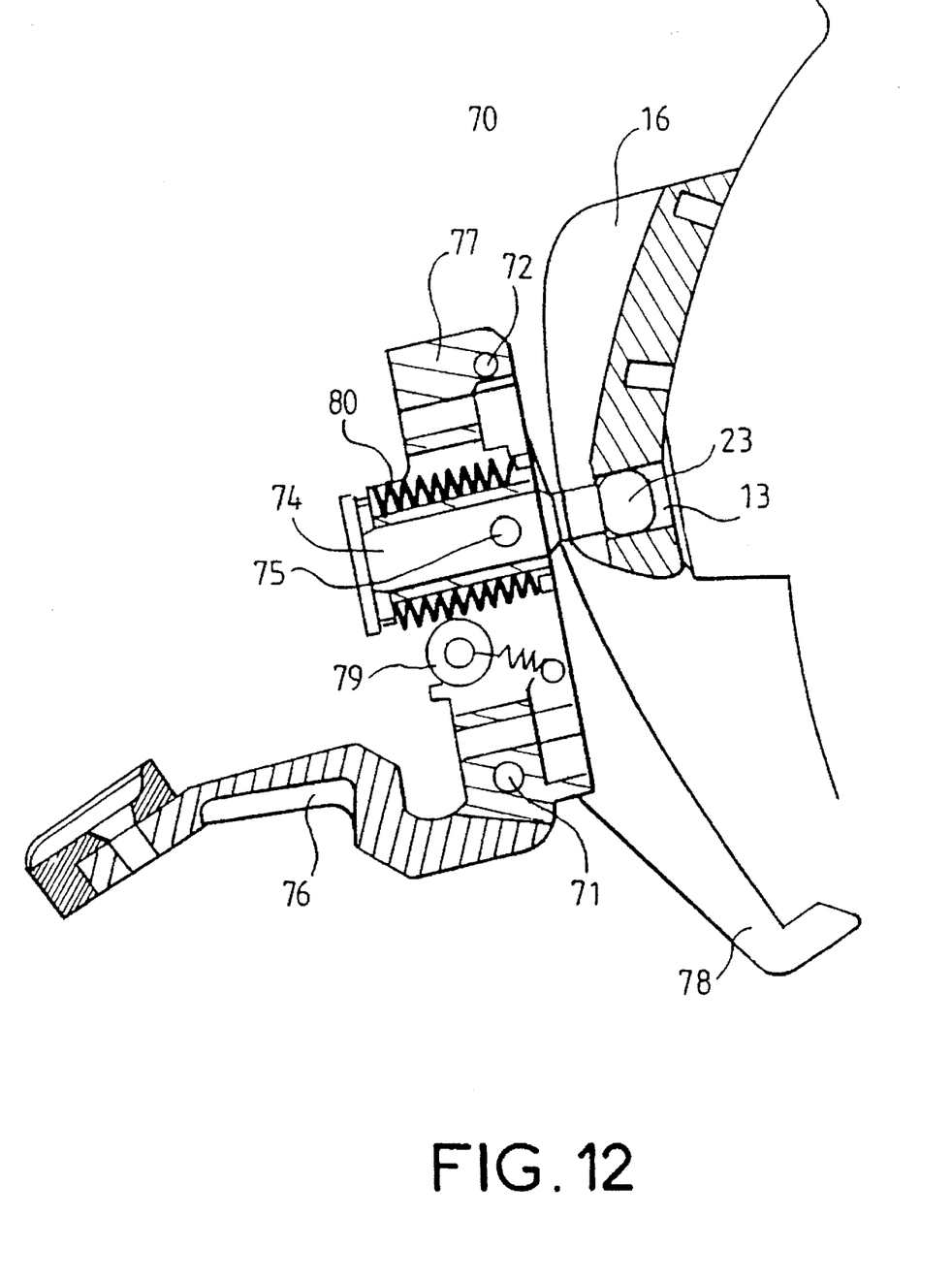
FIG. 12 is a longitudinal section of this same device illustrating the mechanism of withdrawal of the other immobilization part, which holds the structure in its lower position.

FIG. 12 shows a section of the mechanism 70 in a plane perpendicular to the axis 71 of the lever 76 and passing through the axis of the pin 74. The stud 23 is shown engaged in its cylinder 13 in the boss 16 of the shell 10. Rotation of the lever 76 about the spindle 71 causes movement of the pin 74 via the finger 75. When the lever is released, a spring 80 pressing on the body 77 and on a shoulder on the pin 74 pushes the stud 23 to its rest (protruding) position. Similarly, the catch 78 is also returned to its rest position by a spring 79.

What is claimed is:

1. Helmet composed of two main parts, a shell with two side panels connected by the front and rear panels of the shell, and a rigid structure shaped to receive optronic devices, in which the structure can be mounted on and removed from the shell by means of a set of attachments, each attachment including linkage parts in the form of a stud and a cylinder, one of the linkage parts being attached to the shell and the other to the structure, each cylinder having an axial direction, wherein at least one linkage part in each of two of the attachments mounted on the structure is mobile relative to this structure and can be moved into open and closed positions, such that in the open position the two mobile linkage parts enable the structure to be placed on the shell, and in the closed position these mobile linkage parts assure the linkage with the shell via the corresponding linkage parts on the shell, and wherein the structure is equipped with means of holding these mobile linking parts in their open and closed positions, the change from open to closed position being obtained by pressing manually on a part that includes the mobile linkage part mounted on the structure, the pressure being applied to each the parts on each of the two attachments substantially along the axial direction of each of said cylinders.

2. Helmet according to claim 1, wherein said means of holding said linkage parts in their open position include an elastic device exerting a force tending to pull said stud away from said cylinder.

3. Helmet according to claim 1, wherein said mobile linkage parts each comprise a part that is in correspondence with a linkage part mounted on the side panel of the shell.

4. Helmet according to claim 2, wherein at least one of said mobile linkage parts is mobile because it is mounted on an arm that can pivot about fixed axes mounted on said structure.

5. Helmet according to claim 2, wherein at least one of said mobile linkage parts is mobile because it is mounted on a push-button that can move in and out relative to the structure.

6. Helmet according to claim 4, wherein said arm has two bearing surfaces and a stop and wherein said elastic device is connected between the arm and a slide that can move in a direction secant to both the axial directions of said cylinder and the axis of the rotation of the arm, such that in the open position of the arm its first bearing surface and its stop are in contact with the slide, and in the closed position of the arm its second bearing surface is in contact with the slide, the movement of the slide between the first and second positions being achieved by the combined action of manual pressure on the arm, which overrides the stop, and the force exerted by the elastic device on the slide.

7. Helmet according to claim 5, wherein said push-button comprises a rack engaging a first pinion rotating about an axis, wherein said elastic device is connected between this pinion and a point fixed relative to said structure, the point of attachment of the elastic device on the pinion being such that in the depressed position of the push-button the force exerted on the pinion produces a couple tending to rotate the pinion and thereby push the rack in the direction tending to keep the push-button depressed, whereas when the push-button is withdrawn the force exerted by said elastic device tends to keep it withdrawn.

8. Helmet according to claim 7, wherein a second pinion driven by said first pinion causes a translation of a slide fitted with a rack, in a direction other than the axial direction of said cylinder, this slide being in a protruding position when said push-button is in its depressed position, such that the push-button can be forced outwards to its open position by pressing manually on the slide.

9. Helmet according to claim 1, wherein said structure and said shell are equipped with parts intended to guide said structure to its position of locking on said shell, these guiding parts being constituted by bosses on one of said main parts, including said structure and said shell, and slots made in the other main part, these slots being of tapered width such that the bosses are presented to the widest part of the slots when the structure is moved from the front of the shell towards its rear.

10. Helmet according to claim 1, wherein said linkage parts connected to said structure include two mobile parts that are designed to engage linkage parts mounted on the sides of said shell, and one static part protruding from a cavity in the structure.

11. Helmet according to claim 1, wherein said linkage parts include three mobile parts that are designed to engage three linkage parts mounted on said shell, two of them on its sides and one on its front.

12. Helmet according to claim 10, wherein at least one of said mobile linkage parts is mobile because it is mounted on an arm that can pivot about a fixed axis mounted on said structure.

13. Helmet according to claim 10, wherein at least one of said mobile linkage parts is mobile because it is mounted on a push-button that can move in and out relative to the structure.

14. Helmet according to claim 11, wherein said mobile linkage part of the structure, designed to engage the said linkage part mounted on the front of the shell, can take two positions, a closed position in which the mobile linkage part engages the linkage part on the front of the shell, and an open or disengaged position, and wherein the change between the open and closed positions is obtained by moving a control lever manually.

15. Helmet according to claim 14, wherein said structure, once mounted on said shell, can be rotated about the two lateral attachments and can take two stable positions, a lower position in which the mobile linkage part engages the linkage part on the front of the shell, and an upper position in which a catch mounted on the structure engages a connector mounted on the shell.

16. Helmet according to claim 15, wherein said catch can take two positions, a first position in which the catch engages said connector mounted on the shell, and a second position in which the catch is disengaged from this connector, the change between the first and second positions being obtained by manually moving the same control lever used to move the mobile linkage part on the structure between its upper and lower positions.

\* \* \* \* \*